US007232181B2

(12) United States Patent
Schmucker

(10) Patent No.: US 7,232,181 B2
(45) Date of Patent: Jun. 19, 2007

(54) BULLETPROOF WINDOW, CASEMENT THEREFOR, AND METHOD FOR REPLACING AND CONTAINING BULLETPROOF GLASS

(76) Inventor: Joseph Schmucker, 107 Summit Ct., Warner Robins, GA (US) 31088

( * ) Notice: Subject to any disclaimer, the term of this patent is extended or adjusted under 35 U.S.C. 154(b) by 0 days.

(21) Appl. No.: 11/188,181

(22) Filed: Jul. 22, 2005

(65) Prior Publication Data

US 2007/0018481 A1 Jan. 25, 2007

(51) Int. Cl.
*F41H 5/06* (2006.01)
*B60J 1/08* (2006.01)

(52) U.S. Cl. ................ 296/201; 89/36.09; 296/146.16; 49/504

(58) Field of Classification Search ................ 296/201, 296/146.15, 146.16, 96.21, 146.2; 89/36.07, 89/36.08, 36.09; 52/204.54, 204.62; 49/504
See application file for complete search history.

(56) References Cited

U.S. PATENT DOCUMENTS 1,469,922 A 10/1923 Fleckenstein
1,478,447 A 12/1923 Maranville
2,226,833 A 12/1940 Rider
3,923,339 A 12/1975 McDonald
4,132,446 A 1/1979 Bauer
4,336,644 A 6/1982 Medlin
5,261,721 A 11/1993 Conger et al.
5,325,807 A 7/1994 Hidekura
5,442,880 A 8/1995 Gipson
5,594,193 A 1/1997 Sheridan
5,679,918 A 10/1997 Korpi et al.
5,811,719 A 9/1998 Madden et al.
5,857,730 A 1/1999 Korpi et al.
6,102,467 A 8/2000 Laurain et al.
6,302,010 B1 10/2001 Holler

*Primary Examiner*—Joseph D. Pape
(74) *Attorney, Agent, or Firm*—Myers & Kaplan, LLC; Joel D. Myers, Esq.; George P. Bonanto, Esq.

(57) ABSTRACT

A bulletproof window, unitary casement for the window and method for replacing and containing a sheet of bulletproof glass within the casement. The casement securely retains the bulletproof glass therewithin via an 'L'-shaped cover plate secured over the bulletproof glass within the casement. The casement further comprises reliefs to accommodate the bolt heads that secure the cover plate to a hinge, such as on a vehicle door. The corners of the casement are relieved to allow use of a bulletproof glass sheet without the need to form a radius at the corners of the bulletproof glass sheet.

20 Claims, 3 Drawing Sheets

BULLETPROOF WINDOW, CASEMENT THEREFOR, AND METHOD FOR REPLACING AND CONTAINING BULLETPROOF GLASS

TECHNICAL FIELD

The present invention relates generally to windows, and more specifically to bulletproof windows for vehicles, particularly military vehicles, wherein the bulletproof windows are fabricated as a unitary casement construction from a single piece of material in association with a sheet of glass and, optionally, a cover plate to retain the glass in the casement.

BACKGROUND OF THE INVENTION

Bulletproof glass has long been utilized for protecting occupants of vehicles, while at the same time permitting visual observation of the surroundings from within the vehicle. Various methods have been utilized to contain the bulletproof glass, including mounts typically utilized for vehicle glass. Many such mounts are frameworks comprised of welded components. Additionally, window mounts adapted to facilitate removal and replacement of bulletproof glass windows have been attempted, such as via securing the bulletproof glass window utilizing elastic straps or bungee cords.

Unfortunately, typical mounting techniques and/or elastic straps do not retain and/or protect the bulletproof glass, or the window mount, when severe detonations and/or impacts strike the window. Moreover, welded construction has weak points in the weldments and is particularly susceptible to fracture at the juncture of frame top or bottom components with side components. Indeed, the force from impacts at junctures where right angles are formed is transmitted along the weld lines; thereby, propagating a fracture in the weldment.

Accordingly, attempts have been made to prevent such weak points along the weldment. For instance, one such method has utilized continuous polygonal bands glued or welded to side wall segments. However, such glued or welded constructions only mimic the structural weaknesses of other welded constructions.

Furthermore, due to the difficulties in machining bulletproof glass, radiused corners are not commonly fabricated. As such, the unradiused glass corners tend to contact radiused corners in machined casements; thereby, resulting in stress forces applied to the glass, and, thus, an increase in the potential fracture of the glass during normal use and/or upon impact.

Additionally, fractured bulletproof glass can present hazardous conditions to the vehicle occupants, as the tructural integrity and effectiveness is significantly compromized. Moreover, glass may be abraded by natural elements, such as wind-blown sand, thus affecting visibility and requiring periodic replacement.

Although it is occasionally necessary to replace the bulletproof glass of a window during military operations, it is commonly inconvenient to have to return to a base area for such replacement. Even if the opportunity arises to return to base, it is desirable that the vehicle not be out of commission for an extended period. Forward bases for military vehicles may also be sparse and lack a full complement of tools required for extensive repairs. As such, it is desirable that repairs to, and/or replacement of, bulletproof windows be simple and require only commonly available tools.

In addition to ease of replacement concerns, military vehicles commonly have extensive protective armor, which in addition to often heavy bulletproof windows, increases overall vehicular weight, and thus reduces the vehicle's energy efficiency. Accordingly, it is desirable to reduce the weight of any protective armor components.

Therefore, it is readily apparent that there is a need for a bulletproof window that is lightweight, provides improved structural integrity, and permits easy and rapid replacement of the bulletproof glass contained therewithin and/or of the window itself.

BRIEF SUMMARY OF THE INVENTION

Briefly described, in a preferred embodiment, the present invention overcomes the above-mentioned disadvantages and meets the recognized need for such an invention by providing a bulletproof window for a vehicle, unitary casement for the window, and a method for replacing and containing a sheet of bulletproof glass within the casement. The casement securely retains bulletproof glass therewithin via an 'L'-shaped cover plate secured over the bulletproof glass within the casement. The casement further comprises reliefs to accommodate bolt heads that secure the cover plate to a hinge on the vehicle door. The corners of the casement are also relieved to allow use of a bulletproof glass sheet without the need to machine a radius at the corners of the bulletproof glass sheet.

The bulletproof window of the present invention is attached to the hinge on the vehicle door by securing the cover plate to the hinge via fasteners. The casement reliefs permit the cover plate to lie next to the base wall of the casement by accommodating the fastener heads within the reliefs. Because of this construction of the present invention, the bulletproof glass can be quickly replaced by removing other fasteners securing the cover plate to the casement, extracting the remnants of the sheet of bulletproof glass and replacing same with a new bulletproof glass sheet. Since the bulletproof glass can be simply and quickly replaced, there is minimal time during which the vehicle is out of service for such repairs.

According to its major aspects and broadly stated, the present invention in its preferred form is a bulletproof window, casement therefor, and method for replaceably containing bulletproof glass, wherein the bulletproof glass window comprises a casement adapted to receive a sheet of bulletproof glass by providing corner relief openings to prevent contact between the corners of the casement and the corners of the bulletproof glass sheet. In the preferred embodiment, the present invention further comprises an 'L'-shaped cover plate folded at a right angle to cover the bulletproof glass and a side of the casement, wherein reliefs are formed to receive bolt heads for attachment of the window to a hinge on a vehicle door.

More specifically, the present invention is a bulletproof window, casement therefor, and method of replaceably containing bulletproof glass, wherein the bulletproof glass window comprises a unitary casement and a sheet of bulletproof glass, and wherein the casement is milled from a single piece of material, such as, for exemplary purposes only, aluminum. The bulletproof glass window further comprises an 'L'-shaped cover, with first and second planes formed at an angle of preferably ninety degrees.

The casement also comprises a rim, well, base wall, hinge bolt head reliefs and corner reliefs. The corner reliefs eliminate contact between the corners of the bulletproof glass sheet and the corners of the casement; thus, avoiding stress forces that would otherwise be exerted by the unitary casement upon the corners of the bulletproof glass sheet. Avoiding stress forces on the corners of the bulletproof glass sheet lessens the likelihood of the glass fracturing under normal vibrations from use and/or from impacts.

The 'L'-shaped cover is retained within the rim of the casement and is secured to the casement via machine screw or bolt fasteners that engage threads in the casement, securing the cover to the casement and retaining the bulletproof glass sheet therewithin. The cover plate can be quickly removed by removal of the fasteners securing it to the casement and the bulletproof glass can be quickly and easily replaced.

To assemble and use the present invention, the smaller plane of the 'L'-shaped cover is secured to a hinge member on the door of a vehicle via fasteners. A sheet of bulletproof glass approximately two inches thick is placed within the well of the casement, and the larger plane of the cover is secured to the casement via other machine screw or bolt fasteners. The head reliefs within the base of the casement permit the smaller plane of the 'L'-shaped cover to lie proximate the base by permitting the bolt heads to be received within the head reliefs.

Once assembled, the bulletproof glass window is operated via a lever from within the vehicle, wherein the reduced mass of the present invention makes such opening easier, and wherein the present invention reduces vehicle weight and overall energy use. Furthermore, because the window is of unitary construction, weak points are eliminated, improving the resistance to explosive and impact forces.

An alternate embodiment of the present invention comprises only the unitary casement and bulletproof glass sheet contained therewithin, wherein the casement contains corner reliefs to eliminate corner stresses on the bulletproof glass. The casement and bulletproof glass sheet of the alternate embodiment are secured directly to a vehicle door via fasteners without a cover plate, wherein the vehicle door serves to define the cover plate retaining the bulletproof glass within the casement.

Accordingly, a feature and advantage of the present invention is its ability to eliminate structurally weak areas and points in a window casement.

Another feature and advantage of the present invention is its ability to be fabricated as a single unit.

Still another feature and advantage of the present invention is its ability to be quickly retrofitted to existing vehicular door frames.

Yet another feature and advantage of the present invention is its ability to withstand severe forces from detonations and/or impacts.

Yet still another feature and advantage of the present invention is that it permits rapid replacement of the bulletproof glass contained within the casement, and/or replacement of the window.

A further feature and advantage of the present invention is its light weight.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present invention, as illustrated in FIGS. 1A-3B, specific terminology is employed for the sake of clarity. The invention, however, is not intended to be limited to the specific terminology so selected, and it is to be understood that each specific element includes all technical equivalents that operate in a similar manner to accomplish similar functions.

Figure 1A:
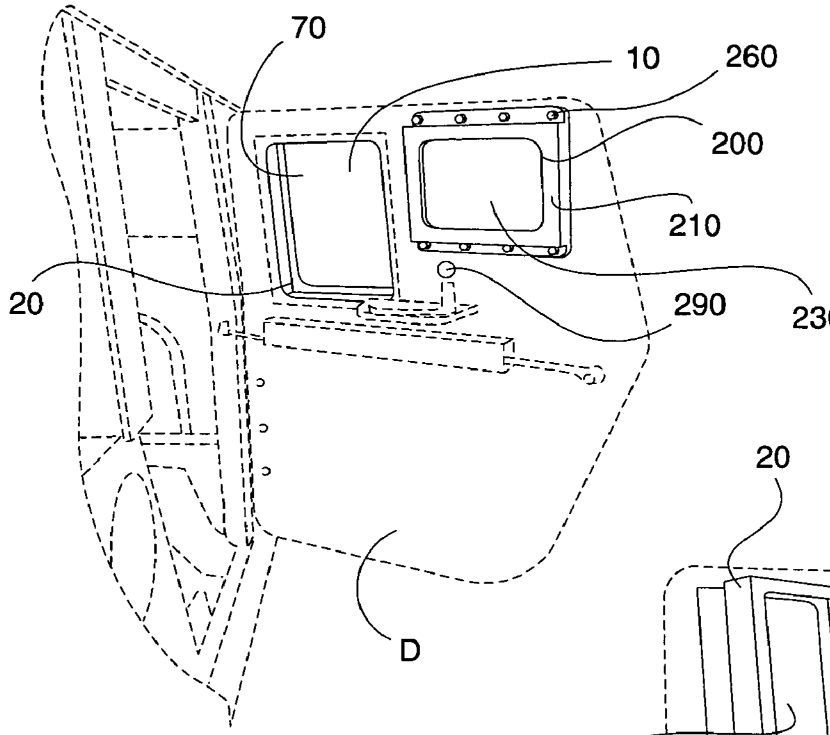
FIG. 1A is a perspective view of bulletproof windows according to preferred and alternate embodiments of the present invention, shown installed on a vehicle door.
Figure 1B:
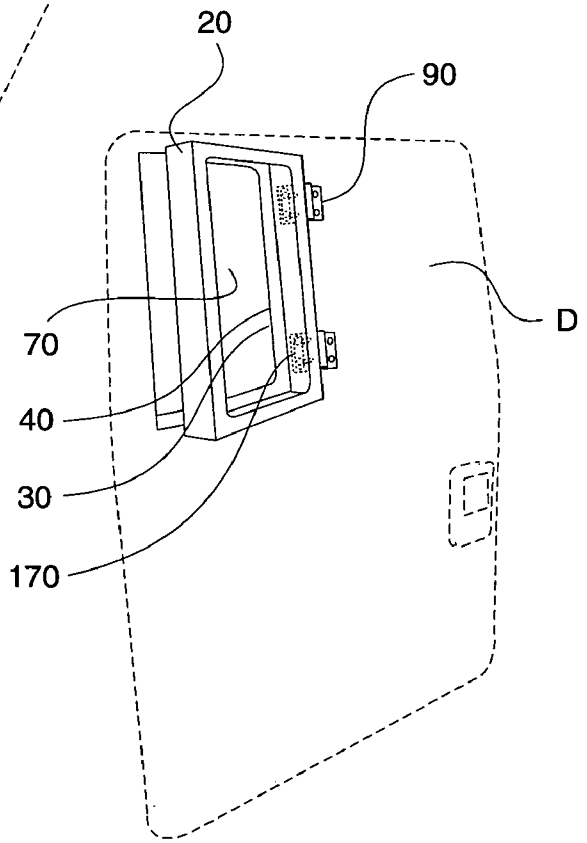
FIG. 1B is a perspective view of a bulletproof window according to a preferred embodiment of the present invention, shown installed on a vehicle door.
Figure 2:
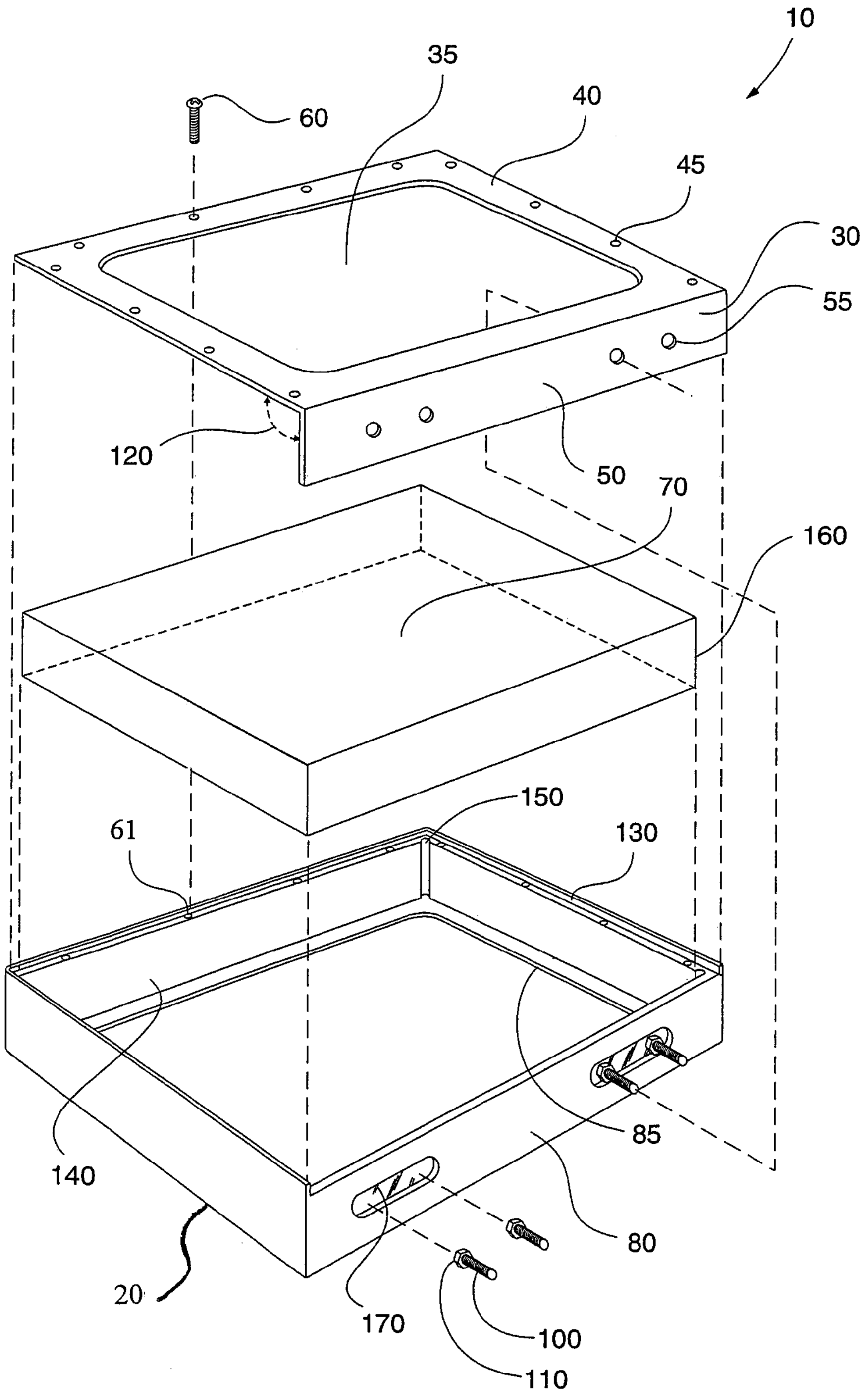
FIG. 2 is an exploded perspective view of a bulletproof window according to a preferred embodiment of the present invention.

Referring now to FIGS. 1A-2, the present invention in a preferred embodiment is bulletproof glass window 10, wherein bulletproof glass window 10 is preferably hingably secured to vehicle door D. Bulletproof glass window 10 preferably comprises unitary casement 20 and bulletproof glass sheet 70, wherein unitary casement 20 is preferably fabricated from a single piece of material, such as, for exemplary purposes only, from aluminum via milling. It will be recognized by those skilled in the art that other metals could be utilized and other fabricating means could be utilized, such as, for exemplary purposes only, casting or forging.

Bulletproof glass window 10 further preferably comprises 'L'-shaped cover 30, wherein cover 30 preferably comprises first planar member 40 and second planar member 50, and wherein first planar member 40 (window section) and second planar member 50 (hinge section) are preferably contiguous and are preferably formed by bending cover 30 at angle 120 of approximately ninety degrees. First planar member 40 further comprises opening 35, wherein opening 35 permits access to bulletproof glass sheet 70 for viewing therethrough. It will be recognized that angles 120 other than ninety degrees could be utilized where it is necessary to conform to different shapes of casement 20 and/or different positions of casement 20 relative to vehicle door D.

Unitary casement 20 preferably comprises rim 130, well 140, base wall 80, flange 85 hinge bolt reliefs 170 and corner reliefs 150, wherein corner reliefs 150 preferably eliminate contact by corners 160 of bulletproof glass sheet 70 with casement 20; thereby, avoiding exertion of stress forces by unitary casement 20 upon bulletproof glass sheet 70.

Cover 30 is preferably secured to unitary casement 20 via fasteners 60, wherein first planar member 40 is preferably disposed on casement 20 to retain bulletproof glass sheet 70 therein, and wherein second planar member 50 is preferably disposed on base wall 80 of unitary casement 20. Fasteners

60, such as for exemplary purposes only, machine screws or bolts, pass through apertures 45 and cooperatively engage threaded apertures 61 in unitary casement 20; thereby, retaining bulletproof glass sheet 70 within unitary casement 20.

In use, second planar member 50 is preferably secured to hinge 90 via fasteners 100. Specifically, fasteners 100 pass through apertures 55, wherein head portion 110 of fasteners 100 are preferably oriented toward the interior of angle 120, and wherein head portions 110 are preferably received within hinge bolt reliefs 170; thereby, preferably permitting second planar member 50 to lie proximate base wall 80 of unitary casement 20. Bulletproof glass window 10 is preferably subsequently assembled by placement of bulletproof glass sheet 70 within well 140 of unitary casement 20, wherein bulletproof glass sheet 70 is retained within flange 85, and wherein cover 30 is preferably secured to unitary casement 20 via fasteners 60. Second planar member 50 is preferably disposed within and retained by rim 130. Fasteners 60 preferably cooperatively engage threaded apertures 61.

The bulletproof glass of the present invention can be quickly replaced by removing the fasteners securing the cover plate to the casement, extracting the remnants of the sheet of bulletproof glass and replacing same with a new bulletproof glass sheet, resulting in minimal downtime for the vehicle.

Bulletproof window 10 is preferably in communication with lever mechanism 290, wherein lever mechanism 290 is utilized to open/close bulletproof window 10 about hinge 90. The reduced mass of the present invention makes such opening of bulletproof window 10 easier, and further reduces vehicle weight and overall energy use.

Figure 3A:
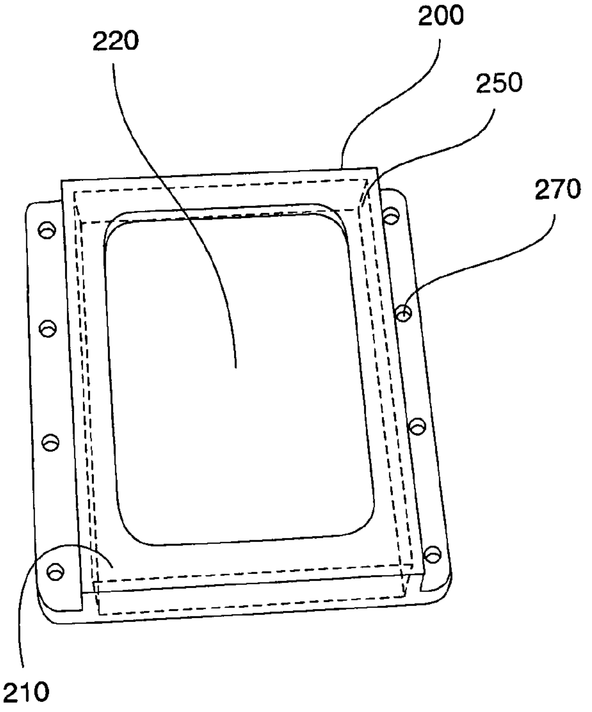
FIG. 3A is a front perspective view of a bulletproof window according to a alternate embodiment of the present invention; and, FIG. 3B is a rear exploded perspective view of a bulletproof window according to an alternate embodiment of the present invention.
Figure 3B:
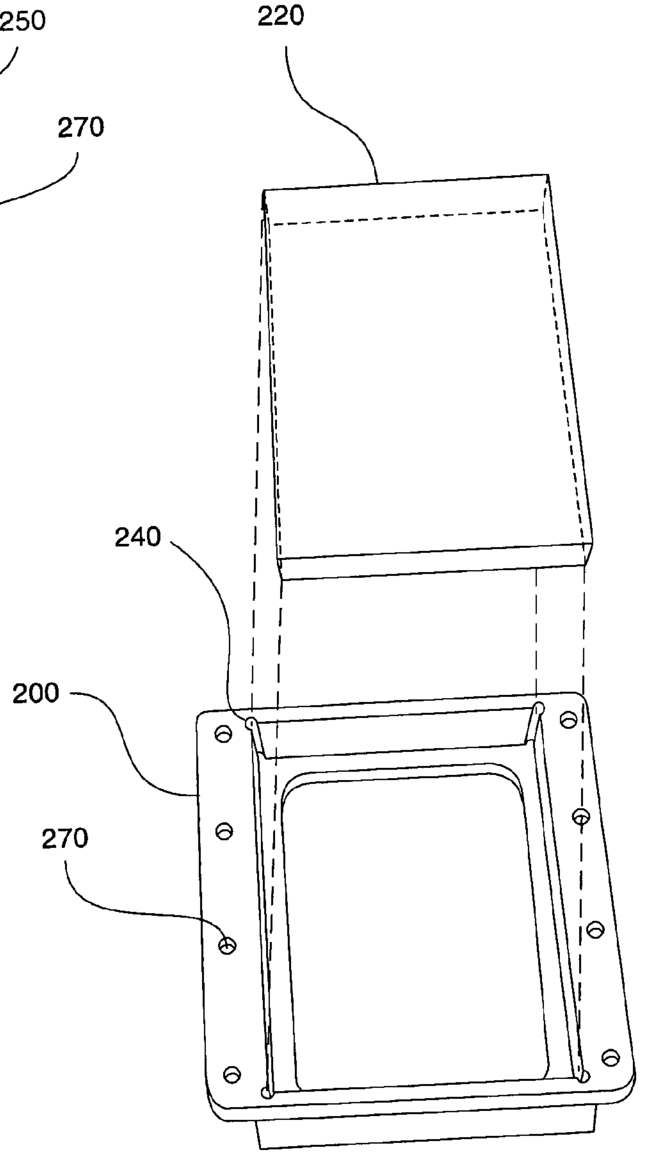

Referring now more specifically to FIGS. 3A and 3B, illustrated therein is an alternate embodiment of bulletproof window 10, wherein the alternate embodiment of FIGS. 3A and 3B is substantially equivalent in form and function to that of the preferred embodiment detailed and illustrated in FIGS. 1A-2 except as hereinafter specifically referenced. Specifically, the embodiment of FIGS. 3A and 3B comprises bulletproof window 200, wherein bulletproof window 200 comprises casement 210. Casement 210 comprises well 220 dimensioned to receive bulletproof glass 230, apertures 270, and reliefs 240 at corners 250 of well 220. Bulletproof window 200 is secured to vehicle door D via fasteners 260, wherein fasteners 260 could comprise bolts or studs and could pass through apertures 270 and be retained within vehicle door D via cooperative mounts 280 (not shown) therein.

In an alternate embodiment of the present invention, it is envisioned that the bulletproof glass windows 10 and 200 could be utilized on fixed structures such as buildings, or on other vehicles such as water and air craft. Because bulletproof glass windows 10 of the present invention are lighter in weight than welded steel windows, the vehicles on which they are installed will be lighter with consequent fuel reduction.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A bulletproof window
- a unitary casement;
- bulletproof glass; and
- a cover plate,
- wherein said cover plate comprises an 'L' shape, and wherein said 'L' shape comprises a window section and a hinge section.

2. The bulletproof window of claim 1, wherein said unitary casement comprises corner reliefs adapted to receive unradiused corners of said bulletproof glass.

3. The bulletproof window of claim 1, wherein said unitary casement comprises a rim adapted to receive said cover plate.

4. The bulletproof window of claim 1, wherein said hinge section is secured to a hinge disposed on a door frame of a vehicle.

5. The bulletproof window of claim 4, wherein said unitary casement comprises relief openings.

6. The bulletproof window of claim 4, wherein said relief openings receive a head portion of at least one fastener securing said hinge section to said hinge.

7. The bulletproof window of claim 1, wherein said bulletproof window is opened and closed via a lever mechanism.

8. A bulletproof glass window adapted to receive a replaceable sheet of bulletproof glass, said bulletproof glass window comprising:
- a unitary casement; and
- a cover plate;
- wherein said cover plate comprises an 'L' shape, and wherein said unitary casement comprises relief openings, and wherein said relief openings receive a head portion of at least one fastener securing said cover plate to a hinge.

9. The bulletproof glass window of claim 8, wherein said unitary casement comprises corner reliefs adapted to receive unradiused corners of the bulletproof glass.

10. The bulletproof glass window of claim 9, wherein said corner reliefs avoid application of stress forces to the unradiused corners of the sheet of bulletproof glass.

11. The bulletproof glass window of claim 8, wherein said unitary casement comprises a rim adapted to receive said cover plate.

12. A bullet proof window comprising:
- a unitary casement, said unitary casement including a face flange and a peripheral wall integrally formed with and extending generally perpendicularly from said face flange; and
- a cover plate removably secured to said peripheral wall opposite said face flange,
- wherein said peripheral wall includes corner reliefs adapted to prevent contact of a corner of a sheet of bulletproof glass with said peripheral wall.

13. In a security window system having a pane of bulletproof glass retained within a frame, said pane having two face sides, a perimeter and a plurality of lateral sides, the improvement comprising:

a unitary casement disposed about the entirety of the perimeter of said pane, said unitary casement comprising corner reliefs.

14. The bulletproof window of claim 12, wherein said peripheral wall includes a plurality of threaded apertures therein for threadably receiving screw members to engage and hold the cover plate.

15. The bulletproof window of claim 12, wherein said cover plate further includes at least one flange disposed substantially normal to said cover plate for engagement with a side of said peripheral wall.

16. The bulletproof window of claim 15, wherein said peripheral wall includes bolt reliefs formed therethrough proximate said flange of said cover plate, and wherein said flange of said cover plate includes at least one aperture formed therethough for receiving a bolt, said bolt adapted to abut a surface of said sheet of bulletproof glass.

17. The bulletproof window of claim 12, wherein said flange of said unitary casement and said peripheral wall define a well, said well adapted to receive said sheet of bulletproof glass.

18. The bulletproof window of claim 17, wherein said sheet of bulletproof glass contacts an interior surface of said peripheral wall when said sheet of bulletproof glass is disposed within said well, and wherein corners of said bulletproof sheet of glass do not contact said peripheral wall due to said corner reliefs.

19. The bulletproof window of claim 12, further comprising a hinge connected to said unitary casement.

20. The bulletproof window of claim 18, wherein said sheet of bulletproof glass is retained within said well by said cover plate.

* * * * *